United States Patent [19]

Iadipaolo

[11] Patent Number: 4,829,380
[45] Date of Patent: May 9, 1989

[54] VIDEO PROCESSOR

[75] Inventor: Rene M. Iadipaolo, Southfield, Mich.

[73] Assignee: General Motors Corporation, Detroit, Mich.

[21] Appl. No.: 130,466

[22] Filed: Dec. 9, 1987

[51] Int. Cl.[4] ..................... H04N 5/208; H04N 5/213
[52] U.S. Cl. .................... 358/166; 358/167; 340/799
[58] Field of Search ............. 358/166, 167, 37, 36, 358/183, 22; 382/54

[56] References Cited

U.S. PATENT DOCUMENTS

| | | | |
|---|---|---|---|
| 3,477,064 | 11/1969 | Hilgendorf et al. | 364/200 |
| 3,535,648 | 10/1970 | Sakowitz | 358/166 X |
| 3,772,465 | 11/1973 | Vlahos et al. | 382/54 X |
| 4,064,484 | 12/1977 | Mese et al. | 340/146.3 |
| 4,323,974 | 4/1982 | Sekigawa | 364/515 |
| 4,340,903 | 7/1982 | Tamura | 358/182 X |
| 4,539,593 | 9/1985 | Jutier et al. | 358/37 X |
| 4,612,569 | 9/1986 | Ichinose | 358/22 |
| 4,613,269 | 9/1986 | Wilder et al. | 364/513 |
| 4,622,546 | 11/1986 | Sfarti et al. | 340/799 X |
| 4,625,330 | 11/1986 | Higgins | 382/55 |
| 4,639,769 | 1/1987 | Fleisher et al. | 358/37 X |
| 4,663,666 | 5/1987 | Bloom | 358/166 |
| 4,672,463 | 6/1987 | Tomohisa et al. | 382/54 X |
| 4,700,229 | 10/1987 | Herrmann et al. | 358/167 X |
| 4,701,793 | 10/1987 | den Hollander et al. | 358/167 X |

FOREIGN PATENT DOCUMENTS

| | | | |
|---|---|---|---|
| 54-105921 | 8/1979 | Japan | 358/183 |
| 54-116123 | 9/1979 | Japan | 358/166 |
| 59-80085 | 5/1984 | Japan | 358/167 |

*Primary Examiner*—James J. Groody
*Assistant Examiner*—E. Anne Faris
*Attorney, Agent, or Firm*—C. R. Meland

[57] ABSTRACT

A video processor operating at camera frame rates is interposed between a camera and a vision system to enhance the signal for improved vision analysis, but always being transparent to the system. Alternatively, in some cases, the processor can be functionally tailored to perform the functions of and replace the vision system. The processor has a reconfigurable architecture to perform a different function in each video frame period, although it repetitively performs the same function on all the image pixels at clock rates within a frame period.

The configuration of the processor is determined for each frame period by microinstructions embodied in a lookup table. Macroinstructions in another lookup table address the appropriate microinstruction set for a desired processor function.

9 Claims, 9 Drawing Sheets

VIDEO PROCESSOR

FIELD OF THE INVENTION

This invention relates to a machine vision video processor or preprocessor and particularly to a video processor capable of single structured data manipulations for generating an enhanced video signal or for extracting discrete results.

BACKGROUND OF THE INVENTION

In industrial usage of machine vision for inspection of parts, monitoring processes and the like, elaborate and expensive vision systems are often employed to acquire and store images of a scene in digital form and analyze the images to extract certain information such as the dimensions of objects, the position or orientation of objects or the presence of visible defects on an object. Usually such systems are required to perform repetitive operations on massive amounts of data and yield results in a very short time. A number of expensive general purpose machine vision systems are commercially available to meet these needs but are often economically unfeasible for applications requiring only a few of their capabilities.

It sometimes happens that a machine vision system can be demonstrated successfully in an ideal setting yet fails to perform consistently in a day-to-day factory operation. Often the lighting varies too much for the system to cope with or dirt build-up affects camera performance. Often, these conditions can be dealt with by the system but may require system redesign or reprogramming, and the extra operations may make the machine too slow to be acceptable. In some cases the system lacks the capabilities for overcoming the problems.

To overcome these problems, an interface unit or preprocessor has been developed to improve the quality of the video signal from the camera before it enters the vision processor. In particular, it uses single structured functions to manipulate stored digital video information and is set up to execute constantly repeatable set functions. The video enhancer has been made to be inexpensive and versatile. To achieve the flexibility necessary to suit varied applications and to deal with sundry problems, it is designed to be easily programmable and very easy for operators to use. It has been found, however, that due to its programmability, it sometimes can carry out the entire vision process and in those cases it can be used as a cost effective replacement for a general purpose vision machine that is several times more expensive.

SUMMARY OF THE INVENTION

It is therefore an object of the invention to provide a video data processor which executes repetitive functions to improve data quality, discernibility and visibility. It is another object to provide such a processor for interfacing between a camera and a vision system and which is transparent to the vision system. It is still another object to provide such a processor which can accomplish the whole vision task without any further machine vision system.

The invention is carried out by means for processing video data, comprising; input means including an A/D converter for receiving analog video signals and converting to digital data at video frame rates, configurable processor means for manipulating the digital data, including a plurality of independent memory means for storing the data for a background scene and for a current scene, and means for storing sets of single structured microinstructions for data manipulations and sets of macroinstructions for enabling selected microinstructions, so that a desired sequence of manipulations can be ordered, the processor means including function processing means for operating on the stored data according to the selected microinstructions to yield programmed results.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 1:
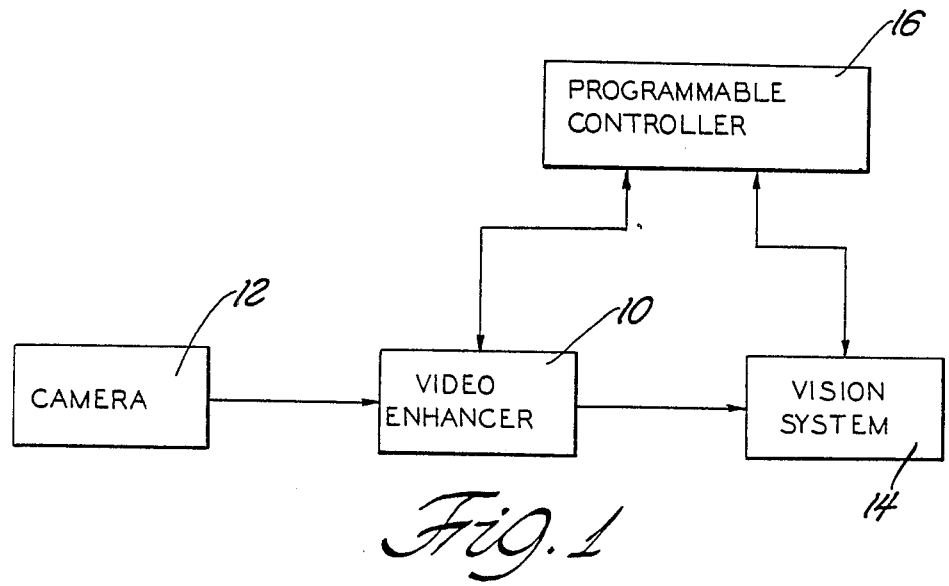
FIG. 1 is a block diagram of a vision application including the video processor according to the invention.
Figure 2:
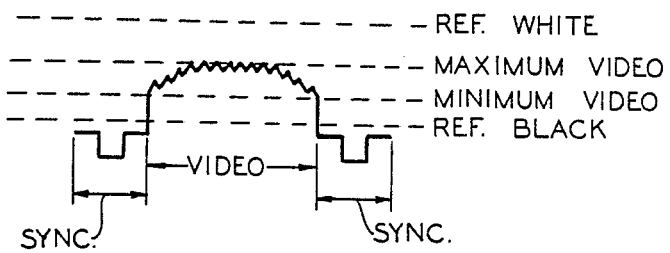
FIGS. 2 and 3 are sample wave forms representing a line of video data before and after processing by the subject processor.

FIG. 1 shows the environment of the video enhancer 10. A video camera 12 captures a scene and issues video signals in the conventional RS170 format. In prior machine vision arrangements the video signal is coupled directly to the vision system 14. This could present a problem when the video signal is less than ideal as illustrated in FIG. 2. There the signal, which represents one line of a video raster, is limited in range since the minimum video signal is well above the reference black level and the maximum video is much below the reference white level. It also may have noise imposed on the signal. According to the invention the video enhancer is interposed between the camera 12 and the vision system 14 for the purpose of improving the quality of the signal thereby allowing the machine vision system to reliably analyze the input image. The operation of the enhancer 10 and vision system is normally coordinated by an external programmable controller 16.

Figure 3:
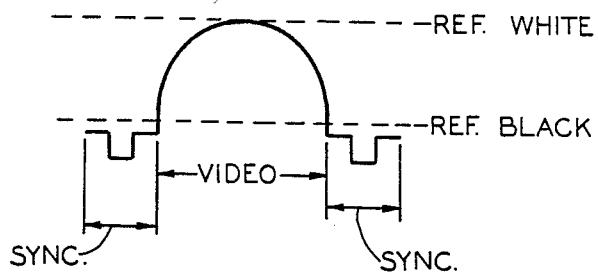

While the enhancer 10 is programmable to operate on the signal in various ways, a preferred way is to filter the digitized stored image to remove noise and then to normalize it so that a more consistent and constant video signal can be produced for ease of subsequent processing by the machine vision system or for improved discernibility of display. Normalizing extends the dynamic range of the signal to cover the whole available range. The result, as shown in FIG. 3, is a smooth signal with maximum and minimum video values equal to reference white and black. In all other respects the enhanced signal appears to the vision system just as if it had come directly from the camera. That is, the enhancer is transparent to the machine vision system or display connected to it. The enhanced signal is still in the RS170 format and the synch signal timing is correct. In addition to filtering and normalizing operations the enhancer will support many other single structured functions. The enhancer can be "taught" a background or reference image for comparison with a "live" or stored image and to update the background image when desired by substituting a more recent live or stored image.

Figure 4:
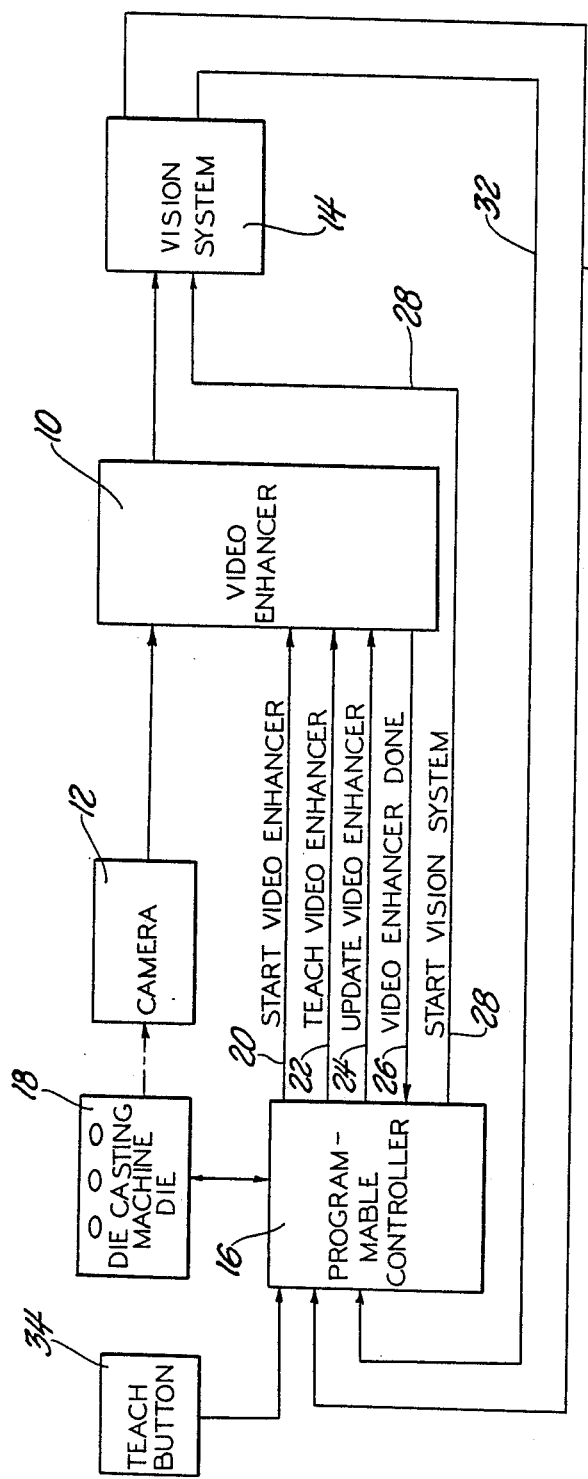
FIG. 4 is a block diagram of an industrial control system incorporating the video processor according to the invention.

FIG. 4 shows the video enhancer 10 in an industrial system for inspecting die cavities of a die casting machine 18 for chips left in the die after a casting operation. The programmable controller 16 has three lines 20, 22 and 24 directed to the video enhancer 10 for the commands "start", "teach" and "update video enhancer", respectively. Line 26 carries a "done" signal from the enhancer 10 to the controller 16. A "start vision system" signal is carried by line 28 to the vision system 14. The outputs "pass" and "fail" from the vision system 14 are coupled to the controller 16 by lines 30 and 32. A teach button 34 signals the controller 16 to begin the teach mode. In operation the camera 12 views the die 18 and generates a video signal at a standard rate, usually 30 or 60 frames per second depending on the camera. The video signal is an analog signal in the RS170 format and is received by the video enhancer 10. At the start of the operation, when the operator determines that the die contains no chips and is suitable as a reference or background image, the teach button 34 is depressed to cause the image to be stored by the enhancer 10. If at a later time, under control of the controller 16 program, it is decided that the stored background image should be updated the update signal causes the most recently stored image to be substituted for the previously taught image. Also under controller 16 control, the start signal causes the enhancer to process the video signal according to a preset set of sequentially executable functions and generate the enhanced output which is fed to the vision system 14. It also issues a "done" signal to the controller. Responsive to the "done" signal the controller 16 commands the vision system 14 to start its image analysis program. The vision system 14, in turn, issues a pass or fail signal which is used by the controller 16 to control the die casting process.

Figure 5:
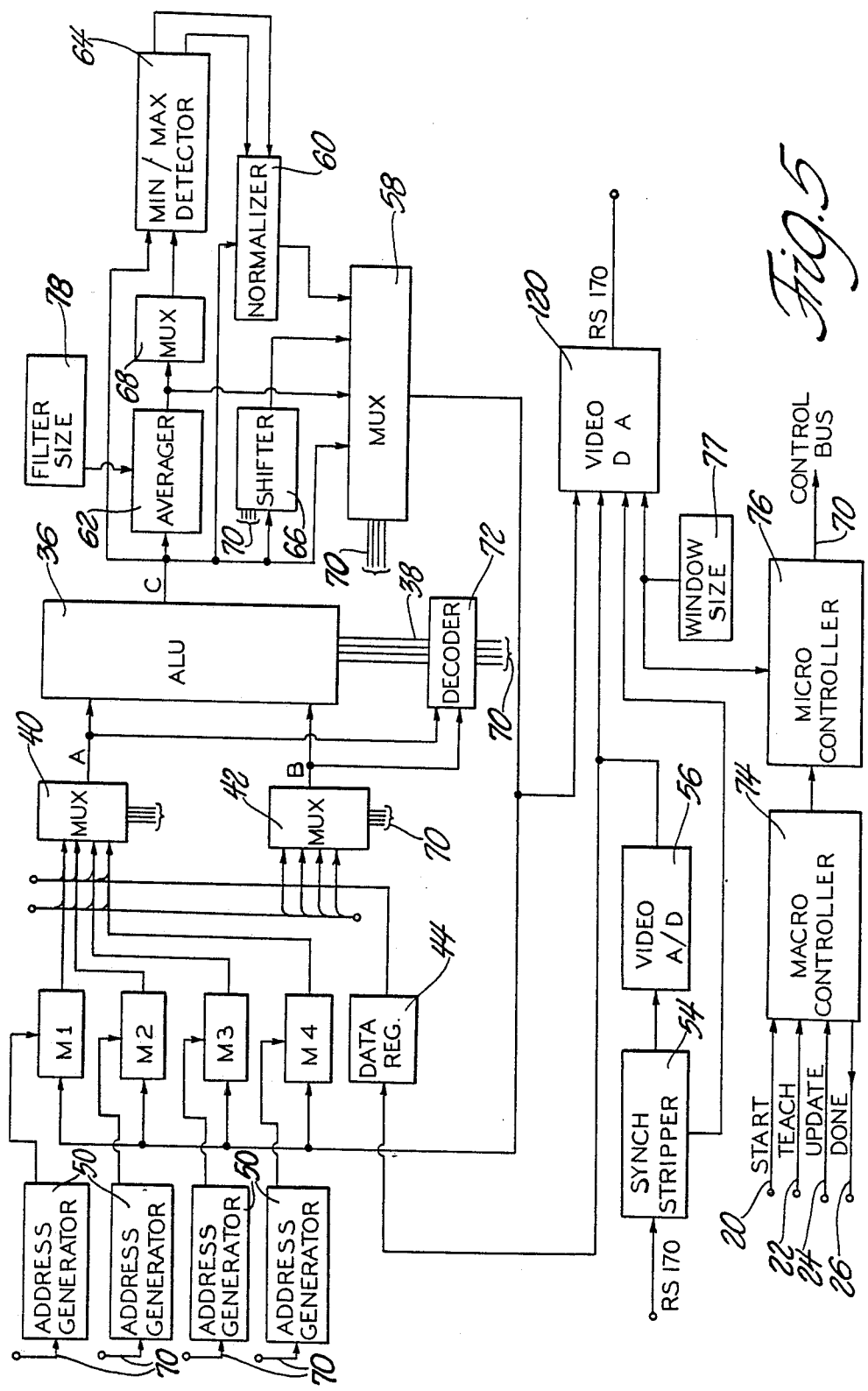
FIG. 5 is a schematic diagram of the video processor according to the invention.

In an alternate configuration where the objective of a machine vision system can be accomplished by the video enhancer, the vision system 14 is omitted entirely, and the pass and fail signals are output from the enhancer to the controller 16 instead of the done signal. This simplifies the implementation of the control system and eliminates a major portion of the total system cost. The structure of the enhancer 10 is shown in FIG. 5. An arithmetic logic unit (ALU) 36 has two inputs A and B and one output C. Function control lines 38 determine the ALU function at any given time. A number of possible sources are selectively coupled to the inputs A and B through multiplexers (MUX) 40 and 42 respectively. The sources include four independent memories M1, M2, M3 and M4 separately connected to the MUX 40 and 42 and a data register 44 for live video input. The input RS170 video signal is processed by a synch stripper 54 and an analog-to-digital converter (A/D) 56 and is then fed to the data register 44. The synch signal is fed directly to a D/A converter to synchronize the enhancer output with the camera.

Preferred memories are of the static type to simplify control and enhance speed. Memory size is determined by the window size. Suitable memories are static RAMs having 32K or 56K bytes capacity and an access time of 100 nanoseconds. Memory cycle time is determined by the desired pixel rate or system clock. The clock rate is preferably 10 MHz.

Each memory has its own address generator 50 which is controlled independently of the others so that data can be read from or written to different memories simultaneously and in a different order. For example, data may be read from one memory in the same order (horizontally) that it was received from the video camera and simultaneously stored in another memory vertically and stored in a third memory horizontally. Control bits to each address generator determine its address pattern for each frame.

The ALU 36 output C is connected to an input of a multiplexer MUX 58, a normalizer 60, an averager 62, a MIN/MAX circuit 64, and a shifter 66. The normalizer 60, the averager 62 and the shifter 66 each have their output connected to the MUX 58. The averager 62 has its output further coupled through a MUX 68 to the MIN/MAX circuit 64. The output of the MUX 58 is fed to the inputs of the memories M1-M4. The ALU function control lines 38 for setting the ALU functions are coupled to a control bus 70 through a decoder 72. The ALU inputs A and B are also connected to the decoder 72. The decoder has the function of enabling the ALU to execute an absolute difference function at pixel rates. The MIN/MAX circuit 64 output is coupled to inputs of the normalizer circuit 60 for storage and use during the execution of the normalize function.

Control for the enhancer is supplied by a macrocontroller 74 which interfaces with the control lines 20, 22, 24 and 26, and a microcontroller 76 coupled to the output of the macrocontroller 74. The microcontroller 76 supplies output signals to the control bus 70. While the control bus is shown as connected to some of the circuit elements, it is actually connected to the memories and other elements susceptible to control. The controllers 74 and 76 are ROM's storing macroinstructions and blocks of microinstructions, respectively, in lookup tables. The macroinstructions are sets of addresses of blocks of microinstructions for carrying out the commands from control lines 20–24.

Figure 5A:
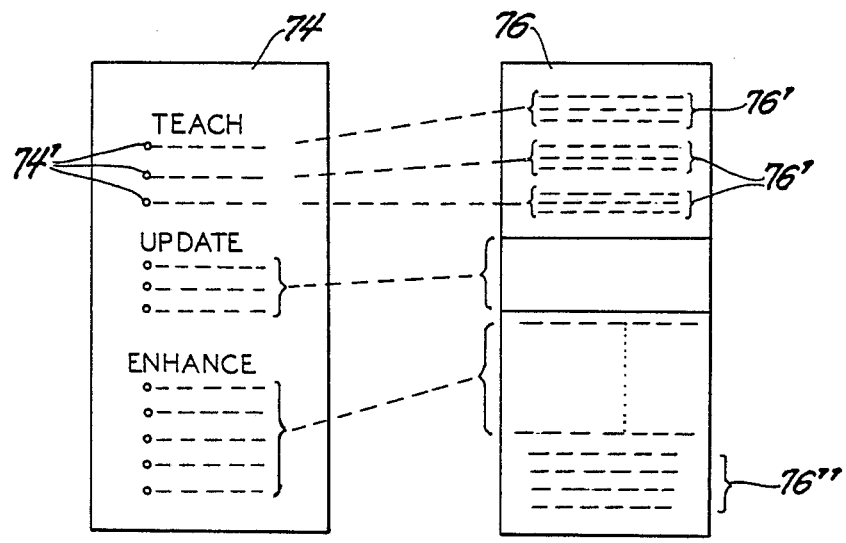
FIG. 5a is a diagram illustrating the instruction structure of the controller of FIG. 5, FIGS. 6 through 9 are functional block diagrams illustrating various functional configurations of the processor according to the invention.

The instructions are so structured that each microinstruction block contains the complete code for ordering the data flow and processor function for each step in the program. Thus the microinstruction controls each multiplexer operation, each memory read or write mode, the ALU function, each ALU source and destination, the address generators, the registers, etc. Each step is executed repetitively in one frame period and all pixels in the selected window are processed in this period. Another block of microinstructions controls the process in the next frame period. A macroinstruction which is activated by a command signal to controller 74 addresses, in order, each microinstruction block in the lookup table in the microcontroller 76. This is illustrated in FIG. 5a which shows for the teach command how each macroinstruction 74' relates to a corresponding microinstruction 76' at a specific address. It also shows a group of microinstructions 76" not addressed by a macroinstruction. These illustrate the versatility of the controller: a universal set of microinstructions to cover all probable configurations and functions of the hardware are stored in the microcontroller 76, so that, for a given application, only the macrocontroller need be custom programmed to invoke the requisite functions.

A distinctive characteristic of the program structure is that unlike conventional programs, decision making is not involved, i.e., branching is not permitted. To distinguish from branching programs the term "single structured" program or instructions is used. This condition results in some limitation on the versatility of the processor but the tradeoff is fast operation, even on massive amounts of data. Every pixel in a window being processed is subject to exactly the same function as the others.

The following abilities characterize the enhancer: 1. A single function is executed on each pixel within the selected window. 2. The function is executed for an entire frame. 3. Each microinstruction control bit, as exhibited on the control bus 70, assumes a steady state control state during each frame. 4. Each function may use one or two source memories and one or more destination memories. 5. Each source and destination memory can be controlled by its own separate address generator or counter. 6. The pixel rate execution of any function is not dependent on whether the data is addressed horizontally (the same as produced by the camera) or vertically. 7. Each function can be displayed as it is being generated digitally.

Figure 6:
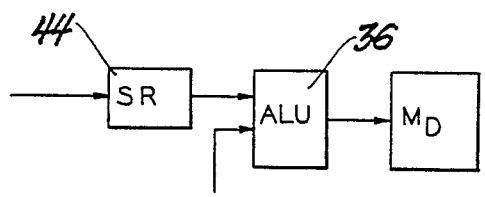
Figure 7:
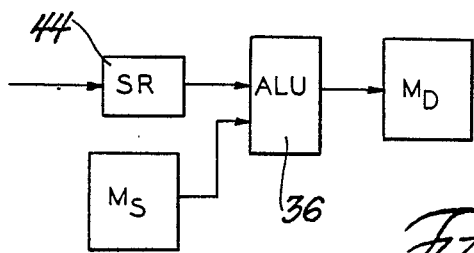
Figure 8:
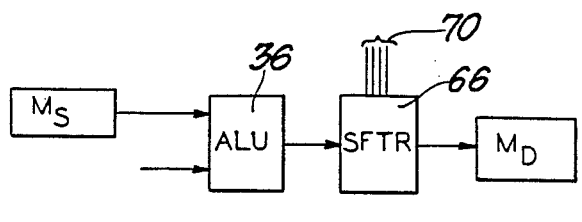

In accord with the above, the ALU 36 can process data, pixel by pixel, from one or two sources coupled to inputs A and B, and can produce one output data set at output C which is directed to one or more destinations. For example, data from memories M1 and M2 may be added by the ALU and the sum stored in M3. FIGS. 6 through 9 graphically illustrate several simple functional configurations that the processor may assume under control of the microinstructions. In every case, any function is executed for the entire window within one frame period. Thus, increasing the size of the window will not change the time to process any function on the pixels within that window. In FIG. 6 live video data is loaded into the register 44, passed through the ALU and stored in a destination memory MD, which may be any of the memories M1-M4. Usually, however, memories M3 and M4 are used for destination memories. In FIG. 7 the video data is added by the ALU to image data stored in a source memory MS and the result is stored in a destination memory MD. In FIG. 8, the data from source memory MS in the form of 16 bit words is passed by the ALU through the shifter 66 for conversion to 8 bit words and stored in destination memory MD.

Figure 9:
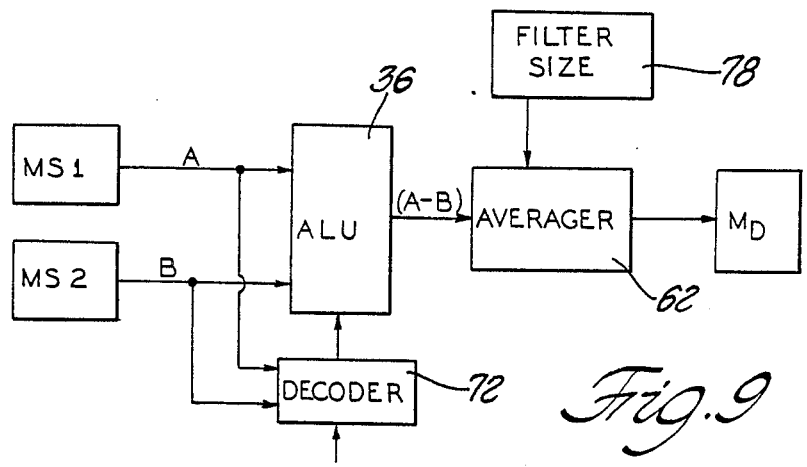

FIG. 9 depicts a special function which directly compares two stored images by determining the absolute difference, pixel by pixel. Image data is fed in from two memory sources MS1 and MS2. The absolute difference function command $|A-B|$ is sent through the decoder 72 to the ALU. The inputs A and B are also input to the decoder 72. The decoder determines whether A or B is larger, and then instructs the ALU to perform $A-B$ or $B-A$ as required to get a positive result. The resultant image may be stored directly in a memory MD or may be input to an averager 62 to perform the first stage of a filtering operation in the same frame period as the absolute difference function.

Figure 10:
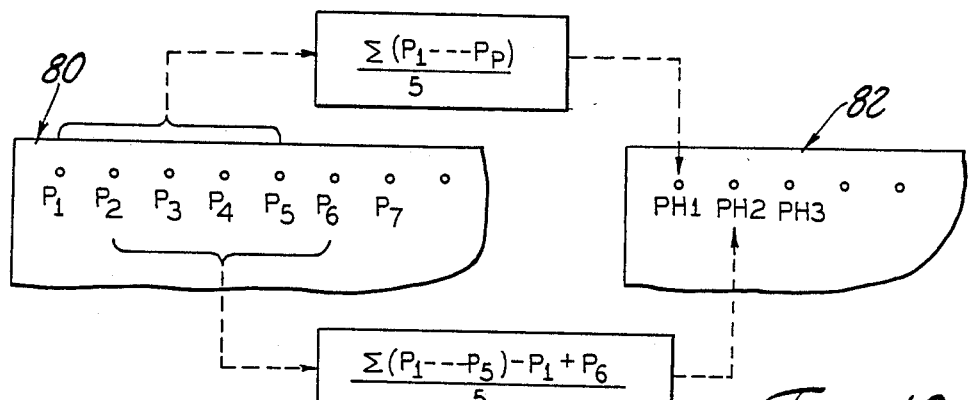
FIGS. 10 and 11 are diagrams illustrating the processes of horizontal and vertical filtering, respectively, performed by the video processor.

A special averager circuit 62 is used to filter the image. Filtering is done in two stages, requiring two frame periods to filter the entire image or window, but as will be seen, other operations may share the same period. This is possible since the ALU and the averager can serially process data to perform two functions per frame period. The filter is preferably square and has a size determined by operator input at box 78. Thus an input of 3 or 10, for example, will yield a filter size of 3×3 or 10×10, respectively. The filtering is accomplished by a horizontal averaging function in one frame period followed by vertical filtering in the following frame period. Thus, if desired, different filter lengths could be used for the horizontal and vertical directions. The filtering scheme for a filter length of 5 is illustrated in FIG. 10 for the horizontal filter which depicts image pixels P1 ... P7 etc. for the unfiltered image 80 and the filtered result PH1 ... PH3 etc. for the filtered image 82. The first five pixels P1 through P5 are summed and divided by five and stored under control of an address generator 50 as filtered pixel PH1. Then the pixels P2 through P6 are similarly averaged and stored as filtered pixel PH2. The specific method of obtaining each new sum of pixels is to subtract an old pixel value from and add a new pixel value to the sum calculated for the previous averaging step, thus minimizing hardware by avoiding the lengthy addition process for each new pixel grouping This averaging technique allows averaging using any filter size to be calculated at pixel rates.

Figure 11:
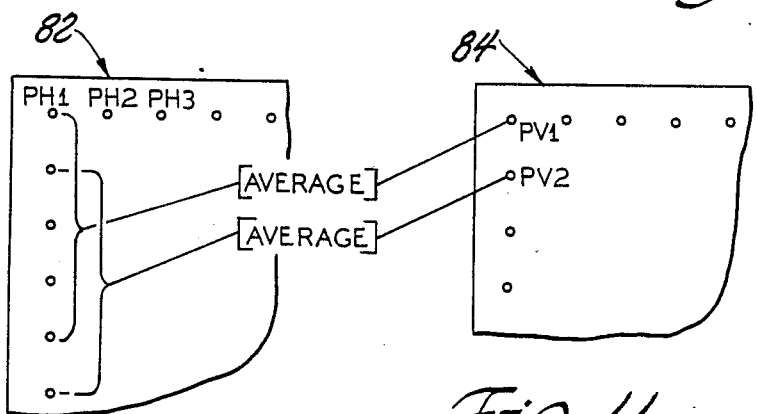
Figure 12:
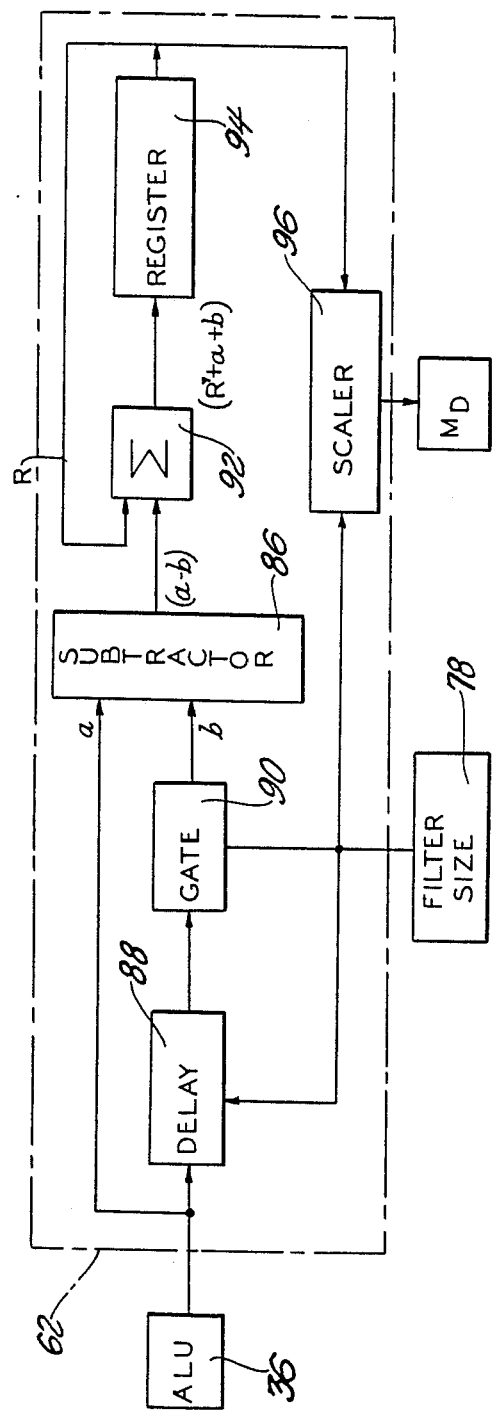
FIG. 12 is a functional block diagram of an averaging circuit incorporated in the video processor.

The same filtering process is adapted to vertical filtering as shown in FIG. 11. There the averaged image 82 comprising pixels PH1 ... PH3 etc. is averaged column wise for five pixel groups and the results PV1, PV2 etc. are stored as image 84. The specific averaging circuit 62 for filtering is shown in FIG. 12. The ALU 36 output is fed directly to an input "a" of a subtractor circuit 86 and is also fed through a delay circuit 88, comprising a variable length shift register, and a gate 90 to an input "b" of the subtractor circuit 86. The delay 88 is conditioned by the filter size input 78 to hold and then pass on each pixel after a delay equal to the filter length. The gate suppresses any values to the "b" input until the initial sum (e.g., P1 ... P5) is accumulated, that is, it is held to a value of zero. The subtractor circuit 86 has an output equal to $a-b$ which is fed to a summer 92. The summer output is fed to a register 94 to store the sum R which is fed back to the summer 92 input so that the summer and register combination serve as an accumulator. Where the register output for the previous clock cycle is R' the new sum $R=R'+a-b$. The sum R is input to a scaler 96 which divides the sum by the filter size to obtain the values PH1, PH2 etc. for horizontal filtering or the values PV1, PV2 etc. for vertical filtering. The scaler 96 is implemented by a PROM lookup table. The values from the scaler are stored in a destination memory MD.

Figure 13:
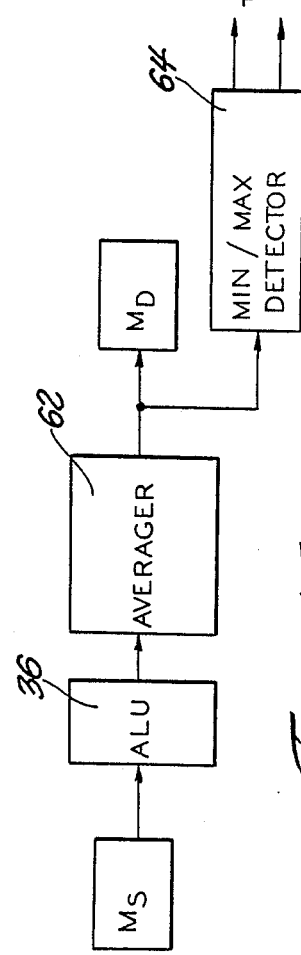
FIG. 13 is a functional block diagram of a filtering arrangement utilizing the averaging circuit of FIG. 12.

FIG. 13 shows the vertical filtering. The pixels contained in memory MS (previously denoted MD in the horizontal filtering step) are addressed vertically and transferred through the ALU 36 to the averager circuit 62 where they are filtered again and stored in Memory MD which is also addressed vertically. This completes the filtering. An additional function is performed during the same frame period, however. The MIN/MAX detector 64 tests each filtered pixel and stores the highest and lowest values in the normalizer circuit 60. These values are used during the normalization function.

As defined here, normalization is the function of processing the data such that the minimum and maximum values correspond to the minimum and maximum values that could be generated by the A/D converter and accepted by the D/A converter. The function is used in order to render the output of the D/A converter more stable and intelligible to an external device such as a vision system or display monitor. In the first case, the vision system can more easily and reliably carry out its functions; in the second case an operator can easily see fine details from a display monitor that he otherwise could not discern.

In the case of 8 bit pixel digitation, gray level values extend throughout the range of 0 to 255. One example of normalization is accomplished by finding the highest and lowest pixel values in the image, assigning the value 0 to the lowest and the value 255 to the highest, and then linearly distributing the intermediate values. The general formula for such normalizing is N=255 (P-MIN)/(MAX-MIN) where N is the normalized value of a given pixel and P is the original value of the pixel.

Figure 14:
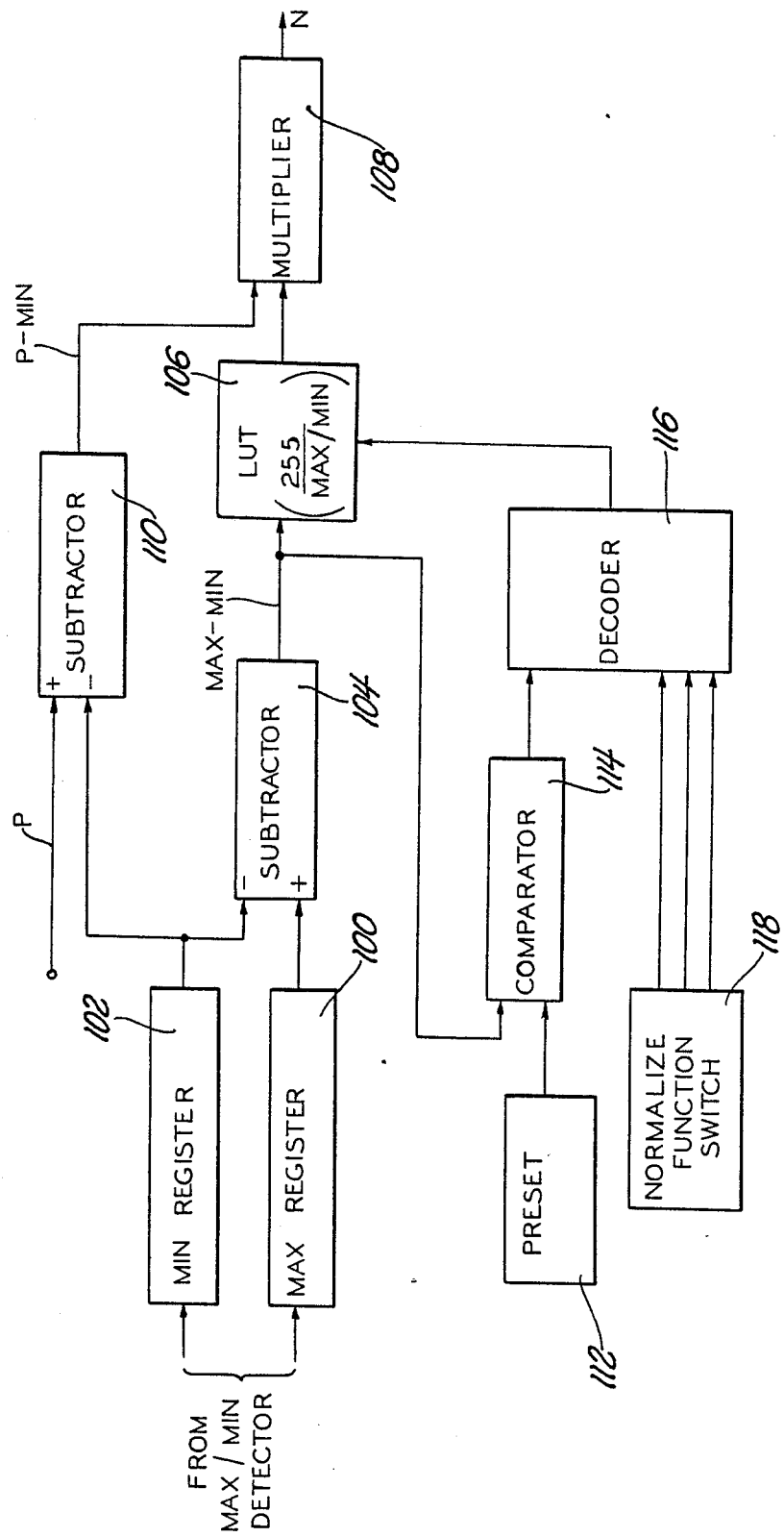
FIG. 14 is a functional block diagram of a normalizer circuit incorporated in the video processor.

The normalizer circuit 60 is shown in FIG. 14. MAX and MIN registers 100 and 102, respectively, store values determined by the MAX/MIN detector 64. The outputs of these registers are coupled to the input of a subtractor 104 which outputs the value MAX-MIN. That value is input to a look-up table 106 programmed to yield the function 255/(MAX-MIN) which is input to a multiplier 108. Another subtractor 110 has as inputs each pixel value P and MIN to yield the difference P MIN MIN which is also fed to the multiplier 108. The multiplier output is N. The normalizer circuit 60 also contains provision for selective control of the normalizer function.

The exact nature of the normalization function is dependent on the application. While the above example yields a linear transfer function, it may be necessary to use a very nonlinear normalization for some applications. It is important therefore that this function b programmable at its own level so that the normalization function can be tailored to a particular application. In the video enhancer, this programmability is attained through lookup table 106. Further programming flexibility is attained by including another lookup table at the output of the subtractor 110 so that the value P-MIN will be subject to the lookup table function.

Preferably the normalization function is conditioned upon the value of MAX-MIN being above some threshold, say, a value between 5 and 10, which is preset by the operator through preset switch 112. Otherwise the variations in the pixel values could be the result of noise and not the result of real changes in the data being normalized. A comparator 114 compares the threshold with MAX-MIN to send a signal to a decoder 116 which usually signals the lookup table 106 to set a control bit which causes the table 106 to issue the normalized data or to issue a value of one, thereby effectively enabling or disabling the normalizing function. Where the function is disabled, the output of the multiplier will be P-MIN thereby producing an offset but not otherwise affecting the data. In some special cases, such as for setup purposes, it is desired to override the normalizing function. For that reason another input to the decoder 116 is a normalize function switch 118 which can be set for "always normalize", "never normalize", or "conditionally normalize". Thus the state of the switch 118 will determine whether the comparator 114 decision will control the lookup table function.

Referring again to FIG. 5, the output of the enhancer comprises a video D/A converter 120. Data inputs are connections directly from the input A/D converter 56 and the processed data output of MUX 58. Window size information is input to the converter 120 as well as to the lookup table by window size control 77. Microinstructions instruct the video D/A 120 what to display within the window. The data displayed outside the window is always the current or live data. The D/A converter 120 adds synch pulses, as produced by the synch stripper 54, to generate a RS170 output signal which, from the standpoint of the subsequent monitor or vision system, appears to come directly from the camera, although the signal within the window has been greatly enhanced. The video portion in the window is delayed one frame period per function performed on it.

In a typical installation the system would be set up to execute a teach mode, an enhance mode, and an update mode. In any mode, a single image may suffice for some applications, but an alternative is to take an average of many frames (say, 2 to 100) of the same scene and store the average for use as the current or live image or as the stored background image. This averaging function greatly improves the repeatability of the video readings. Without this averaging function it is not unusual to find that a given pixel in comparable successive images varies from a median by an amount of + or −7 on a scale of 255. Thus, whenever image acquisition takes place a programming option is to include the averaging step. Another option is to select a window in the image to limit the amount of memory that is required by the application.

For the teach mode, the macrocontroller 74 is programmed to respond to pressing the teach button 34 to direct the live image data to the memory M1 designated for the background image (called the "background memory"). When operating in a non-averaging mode, the ALU 36 is directed to pass through the data from the source to the destination memory while the data register 44 is designated as the source and the background memory M1 is the destination memory. During this mode the live data is output from the D/A converter 120 to yield the current image.

The update mode may be activated by an indication from the vision system or the controller 16 that the current live image corresponds to a "good" part or scene. In this mode the ALU transfers the image from the most recently stored image in storage M2 to the background memory M1. To keep the current image intact, it is thus required that the memory for the live storage be dedicated to that function and not be used as a working memory. This adaptive feature keeps the background image current in spite of slowly changing illumination or other conditions. In this mode the current image is output from the converter 120.

The enhance mode could take many forms limited only by the kinds of functions that can be performed by the hardware and the time allowed to process the required functions. This discussion will be for a preferred operation where subtle flaws are to be detected and data acquisition in in nonaveraging mode. Assuming that the background scene has been stored, say in M1, and the start command has been issued, the image from the camera is fed through the data register 44, the MUX 40 and the ALU 36 and is stored in the live memory M2 during the first frame period. In the second frame period, the absolute difference between the background image and the live image is calculated by the configuration shown in FIG. 9 where the source memories are M1 and M2. At the same time the horizontal filter function is performed and the result stored in memory M3. In the third frame period, the data in memory M3 is read out in vertical columns and transferred to the averager 62 which performs the vertical filtering and stores the image in M4. During the same period the MIN and MAX of the filtered pixels are detected and stored in the registers 100 and 102. In the fourth frame period, if the normalize function switch 118 is set to normalize conditionally, the data in M4 is normalized and stored in M3. If the normalizing function is disabled the data is transferred to M3 without being normalized. At the end of this mode, the image generated by the D/A converter 120 represents the normalized image for pixels within the window and live image for pixels outside the window.

Figure 15:
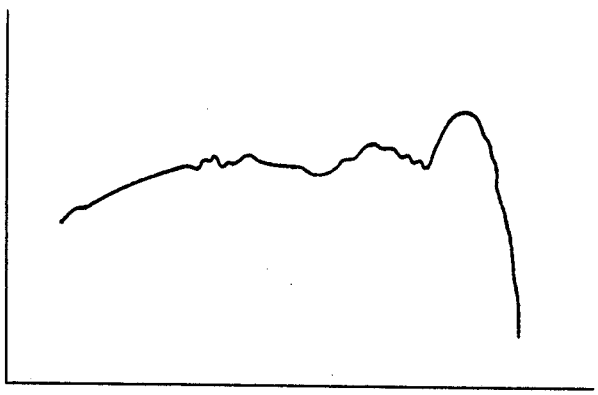
FIGS. 15 through 19 are wave forms representing lines of video data and results of processing by the video processor according to the invention.
Figure 16:
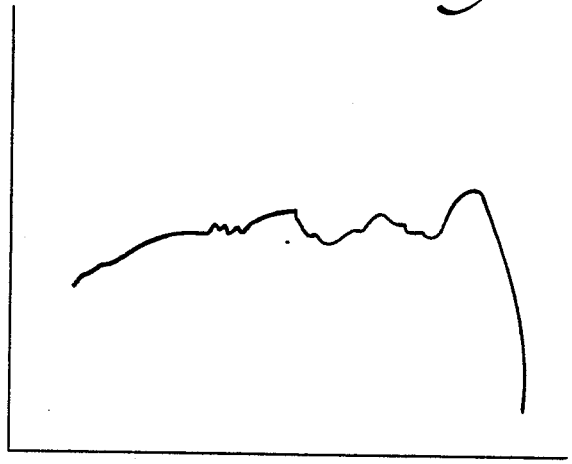
Figure 17:
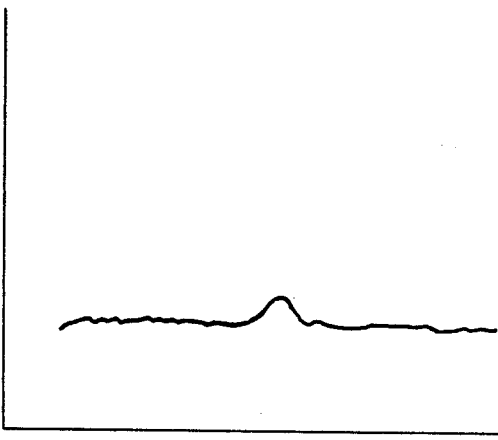
Figure 18:
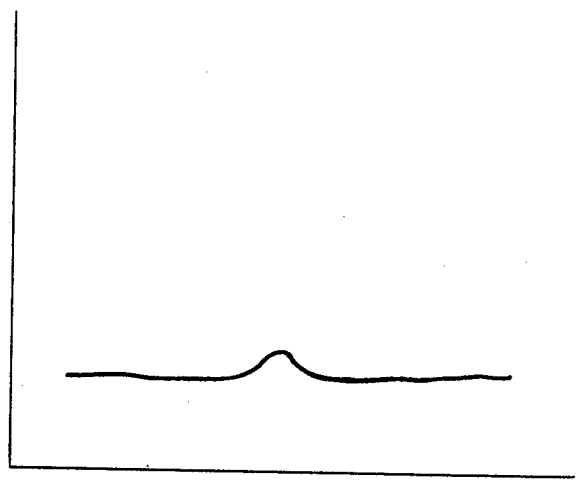
Figure 19:
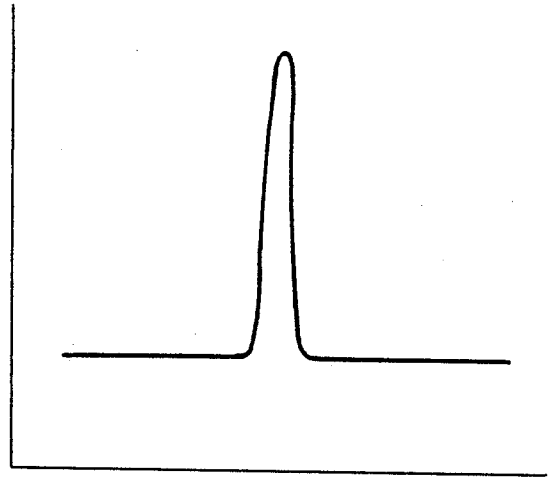

FIGS. 15 through 19 show the effects of the enhancement procedure on one line of a video image. FIG. 15 represents the pixel values of one video line of the background image in M1 and FIG. 16 is the corresponding line of the live image in M2. FIGS. 17 and 18 are the results of the absolute difference of the background and live images prior to filtering and after filtering, respectively. The small bump in the curve represents a difference between the live scene and the scene chosen for the background or standard. In the context of the application illustrated in FIG. 4, the bump represents a chip in the die. Normalization of the FIG. 18 wave form results in the FIG. 19 curve which clearly shows the difference. It is plain that the enhanced image is so much improved that subsequent analysis by a vision system is made easier and more certain. The vision system can be dispensed with in those cases where the enhancer provides the required expected results, for example, the presence or absence of a defect.

Many other enhancement procedures may be used with the structured repetitive functions that are readily executed by the hardware. Some functions for improving data quality not mentioned previously are median filtering, gaussian filtering, edge detection, and blob finding (yielding size and location). The latter function can make possible output decisions about the acceptability of an part. Median and gaussian filtering require the addition of LSI devices which are readily incorporated into the hardware.

It will thus be seen that the video processor according to the invention provides a low cost image enhancer which can rapidly perform repetitive functions on image pixels at frame rates to provide an improved analog video signal for subsequent analysis by a machine vision system, and in some cases can do sufficient processing to make any additional analysis unnecessary.

The embodiments of the invention in which an exclusive property or privilege is claimed are defined as follows:

1. Means for processing video data comprising;
    means for acquiring video data at video frame rates,
    a plurality of independent storage means for storing video data for an image frame to be processed,
    ALU means and data flow control means for repetitively processing, within a frame period, all the data in one or two storage means in accordance with a defined function and, in the same period, storing the resultant data in another storage means, and further processing and storing data in subsequent frame periods in accordance with other functions which are useful for enhancing the data,
    a controller for managing the type and sequence of ALU functions having a first ROM storing sets of function sequences and addresses for the respective functions, and a second ROM storing detailed instructions at the said addresses for executing each function respectively, whereby for each frame period the first ROM addresses a specific instruction in the second ROM, and
    means for addressing the first ROM for initiating a desired set of functions,
    whereby the frame of video data can be programmably enhanced to optimize the data quality for a given application.

2. Means for processing video data as defined in claim 1 wherein means for special functions are coupled to the output of the ALU means for serially executing special functions on the data processed by the ALU in the same frame period as the ALU processing.

3. Means for processing video data as defined in claim 2 wherein the ALU function is data transfer from storage means to the means for special functions.

4. Means for processing video data as defined in claim 2 wherein the ALU function is calculating the absolute difference of data in two storage means.

5. A video enhancer for improving data quality in a vision system, comprising;
    input means including an A/D converter for receiving analog video signals and converting to digital data,
    processor means for manipulating the digital data, and
    output means including a D/A converter for converting the processed digital data to analog video signals for use as input signals to a vision system, wherein the processor means includes independent memory means for storing the data for a background scene and for a current scene,
    firmware for storing sets of single structured microinstructions for data manipulations and sets of macroinstructions for enabling selected microinstructions, so that a desired sequence of manipulations can be ordered, and
    an ALU subject to the firmware for operating on the stored data according to the selected microinstructions to yield improved data.

6. Means for improving the quality of machine vision data comprising;
    at least three separate storage means for storing digital pixel values for a frame of vision data,
    ALU means for processing data from one or two storage means in accordance with defined functions which are useful for enhancing the data and storing the resultant data in another storage means,
    a controller for managing the type and sequence of ALU functions having a first ROM storing sets of function sequences in the form of addresses for the respective functions, and a second ROM storing detailed instructions at the said addresses for executing each function respectively, and
    means for addressing the first ROM for initiating a desired set of functions,
    whereby the frame of vision data can be programmably enhanced to optimize the data quality for a given application.

7. A video enhancer for improving data quality in a vision system, comprising;
- input means including an A/D converter for receiving analog video signals and converting to digital video data,
- processor means for manipulating the digital data, and
- output means including a D/A converter for converting the processed digital data to analog video signals for use as input signals to a vision system, wherein the processor means includes memory means for storing the data for a background scene and for a current scene and additional working memory for processed data,
- firmware for storing sets of single structured instructions for data manipulations,
- an ALU for operating on the stored data according to the stored instructions to yield improved data, and
- means including the additional memory for filtering the improved data by averaging horizontal groups of pixels and then averaging vertical groups of horizontally, averaged pixels.

8. A video enhancer as described in claim 7 having contrast enhancement means including; means for detecting the maximum and minimum pixel values in the filtered data, and normalizing means responsive to the minimum and maximum values for assigning new values to each pixel to expand the range of pixel values to the whole available range.

9. A video enhancer as described in claim 7 wherein the firmware is programmed to instruct the ALU to calculate the absolute difference between the background scene and the current scene, pixel by pixel, for revealing any difference between the scenes.

* * * * *